United States Patent Office 2,849,462
Patented Aug. 26, 1958

2,849,462

METHOD FOR PREPARING 19-NOR 17-α-ETHYNYL TESTOSTERONE

Pietro de Ruggieri, Milan, Italy

No Drawing. Application April 16, 1957
Serial No. 653,060

1 Claim. (Cl. 260—397.4)

The present invention relates to a method for preparing an important compound belonging to the class of progestational hormones, namely 19-nor 17-α-ethynyl testosterone, starting from the 3-derivatives of the 17-cyanohydrin of 19-nor androstenedione, particularly from 3-ethoxy, 17-cyano,17-ol,estra,3-5-diene or from 3-ethylenedioxy, 17-cyano,17-ol,estra,5-ene which have already been described in my co-pending applications S. N. 653,059 and S. N. 653,078, each filed April 16, 1957.

By reacting a solution of the above mentioned cyanohydrin with potassium t.amyloxyde and acetylene, then treating with aqueous hydrochloric acid, the object of the present invention, namely 19-nor, 17-α-ethynyl-testosterone, is readily obtained in a very high yield. This product melts at 203°–204°.

*Examples*

(1) A solution of 10 parts by weight of 3-ethoxy, 17-cyano, 17-ol,estra,3-5-diene in 250 parts of anhydrous toluene is added to a solution of 10 parts of potassium in 250 parts of t.amyl alcohol. Air is expelled by bubbling nitrogen in the mixture for about 20 minutes, then a slow flow of dry acetylene is run in at room temperature for 10–15 hours. The solution is diluted with water, made acidic with 4 n hydrochloric acid and then steam-distilled until any volatile substance has been removed. After cooling the solid phase is filtered and crystallised from ethyl acetate yielding 8-8,2 parts of 17-α-ethynyl,19-nor testosterone. M. P. 202°–204°.

$$E+OH\lambda \text{ max at } 240 \text{ m}\mu; \log \epsilon = 4.2$$

(2) The same procedure is followed as in Example 1 except that 3-ethylenedioxy,17-cyan,17-ol,estra,5-ene is employed instead of 3-ethoxy-17-cyano-17-ol,estra,3-5-diene.

I claim:

A method for preparing 19-nor,17-α-ethynyl testosterone comprising the steps of reacting compounds selected from the group consisting of 3-ethoxy-17-cyano-17-ol-estra,3-5-diene or 3-ethylenedioxy-17-cyano-17-ol-estra,5-ene, and acetylene in presence of potassium t.amyloxide and decomposing the product by hydrochloric acid.

No references cited.